(12) United States Patent
Davis et al.

(10) Patent No.: US 6,209,502 B1
(45) Date of Patent: Apr. 3, 2001

(54) INTAKE MANIFOLD WITH MULTIPLE STAGE RAM INDUCTION

(76) Inventors: Gregory G. Davis, 4059 Hillside Ave., Norco, CA (US) 92680; Kenneth Thurm, 2348 N. Rockridge Cir., Orange, CA (US) 92867

( * ) Notice: Subject to any disclaimer, the term of this patent is extended or adjusted under 35 U.S.C. 154(b) by 0 days.

(21) Appl. No.: 09/286,957

(22) Filed: Apr. 6, 1999

(51) Int. Cl.[7] .................................................. F02M 35/10
(52) U.S. Cl. .............................. 123/184.46; 123/184.32
(58) Field of Search .................... 123/184.32, 184.39, 123/184.46

(56) References Cited

U.S. PATENT DOCUMENTS

| | | |
|---|---|---|
| 3,933,142 | 1/1976 | List et al. . |
| 4,421,080 | 12/1983 | Kogure et al. . |
| 4,606,308 | 8/1986 | Furlong . |
| 4,686,948 | 8/1987 | Smith, Jr. et al. . |
| 5,474,044 | 12/1995 | Matterazzo et al. . |
| 5,558,061 | 9/1996 | Suminski . |
| 5,598,820 | 2/1997 | Sokoloski . |
| 5,816,210 | 10/1998 | Yamaguchi . |
| 5,913,554 | 6/1999 | Oda et al. . |
| 5,950,582 | 9/1999 | Stein . |

FOREIGN PATENT DOCUMENTS

| | | | |
|---|---|---|---|
| 1933142 | * 10/1970 | (DE) | ................................ 123/184.46 |
| 431221 | * 7/1935 | (GB) | ................................ 123/184.39 |
| 52-77907 | 12/1975 | (JP) . | |
| 52-32416 | * 3/1977 | (JP) | ................................ 123/184.46 |

* cited by examiner

Primary Examiner—Noah P. Kamen
(74) Attorney, Agent, or Firm—Kit M. Stetina; Thomas C. Naber; Stetina Brunda Garred & Brucker

(57) ABSTRACT

An intake manifold for a four-cycle internal combustion engine with multiple stages to reduce imbalances in volumetric efficiency and air/fuel ratio. The intake manifold utilizes at least two ram stages coupled by a plenum chamber. The first stage includes a ram tube that carries the air/fuel mixture from the carburetor, or throttle body to the plenum chamber. The second stage includes at least two ram tubes that carry the air/fuel mixture from the plenum to a plurality of intake valves through cylinder head intake ports. The plenum chamber acts as a buffer between each intake valve and the carburetor or throttle body. The air/fuel mixture enters the first stage ram tube and passes into the plenum chamber. These gases then pass into either one of the second stage ram tubes, depending on which cylinder is at its intake stroke. By drawing the air/fuel mixture from the plenum instead of directly from the first stage ram tube, differences in the air/fuel ratio and volumetric efficiency are minimized. This is because the transient differences in the conditions that exist within the first stage ram are reduced within the plenum chamber.

12 Claims, 2 Drawing Sheets

INTAKE MANIFOLD WITH MULTIPLE STAGE RAM INDUCTION

FIELD OF THE INVENTION

The present invention relates to the field of four-cycle internal combustion engines, and more particularly to a multiple stage ram intake manifold for a four-cycle internal combustion engine.

BACKGROUND OF THE INVENTION

Internal combustion engines generate power by igniting a mixture of fuel and air. In order to get the most power from the fuel, that is, for the most efficient operation, many parameters of the combustion process must be optimized. Much research has gone into finding ways to increase efficiency by varying these parameters. As a result, the fuel efficiency, and hence fuel economy of vehicles, has improved dramatically.

Two of the important factors affecting the efficiency of internal combustion engines are air/fuel ratio and volumetric efficiency. Volumetric efficiency is defined as the volume flow rate of air into the intake system divided by the rate at which volume is displaced by the piston. Not only is it important for these parameters to be optimized for each cylinder but it is also important to minimize variations in these parameters. Such variations can occur within a given cylinder at different times, or can occur between individual cylinders in an engine. Undesirable variations in combustion parameters will create imbalances in the engine's operation that will affect efficiency and overall performance.

One example of such an imbalance is known as "odd fire" power impulses. This occurs, for example, in two cylinder, 45-degree V-Twin motorcycle engines. In these engines there occurs an interval of 315 degrees of crankshaft rotation between a first pair of power impulses, followed by an interval of 405 degrees between the following two power impulses. The different spacing results in different air/fuel conditions occurring in the intake manifold when the charge enters the cylinder. Such differences may result from variations in factors such as temperature, pressure or turbulence inside the intake manifold.

In any event, these variations cause the cylinders to fire with different air/fuel ratios and different volumetric efficiencies depending on whether they fire after the 315-degree interval or the 405-degree interval. This affects the way the engine operates, for example it results in timing differences in back-pulse waves through the induction system before mechanical induction demand. This can adversely affect the performance of the engine, causing it to run less smoothly and with lower efficiency. Thus, it would be desirable to provide a way to minimize the variations in the air/fuel conditions between cylinders that result from "odd fire" power impulses.

SUMMARY OF THE INVENTION

An intake manifold for a four-cycle internal combustion engine with multiple stages to reduce imbalances in volumetric efficiency and air/fuel ratio. The intake manifold utilizes at least two ram stages coupled by a plenum chamber. The first stage includes a ram tube that carries the air/fuel mixture from the carburetor, or throttle body to the plenum chamber. The second stage includes at least two ram tubes that carry the air/fuel mixture from the plenum to a plurality of intake valves through cylinder head intake ports.

The plenum chamber acts as a buffer between each intake valve and the carburetor or throttle body. The air/fuel mixture enters the first stage ram tube and passes into the plenum chamber. These gases then pass into either one of the second stage ram tubes, depending on which cylinder is at its intake stroke. By drawing the air/fuel mixture from the plenum instead of directly from the first stage ram tube, differences in the air/fuel ratio and volumetric efficiency are minimized. This is because the transient differences in the conditions that exist within the first stage ram are reduced within the plenum chamber. For example, differences in the air/fuel mixture that depend on the time interval between successive power impulses, resulting from "odd fire" power pulses, are lessened within the plenum chamber. The result is that the conditions within the plenum chamber are much more stable than within the first stage ram tube so that both cylinders receive charges that are more similar and the engine runs in a more balanced manner.

DETAILED DESCRIPTION OF THE DRAWINGS

The present invention is an intake manifold for an internal combustion engine. In a preferred embodiment of the invention the inventive concepts will be applied to a two cylinder, four-cycle, 45 degree V-Twin motorcycle engine. While this embodiment is used herein to illustrate the invention, it will be appreciated that many other configurations and types of internal combustion engines may also benefit by incorporating the teachings of the invention. For example, the invention may be applied to engines other than motorcycle engines and to engines having different numbers of cylinders. Also, the intake manifold may be configured to supply a different number of cylinders. By using the teachings of the present invention, adapting the intake manifold of the preferred embodiment to other types of engines will be within the ordinary abilities of one skilled in the art.

Figure 1:
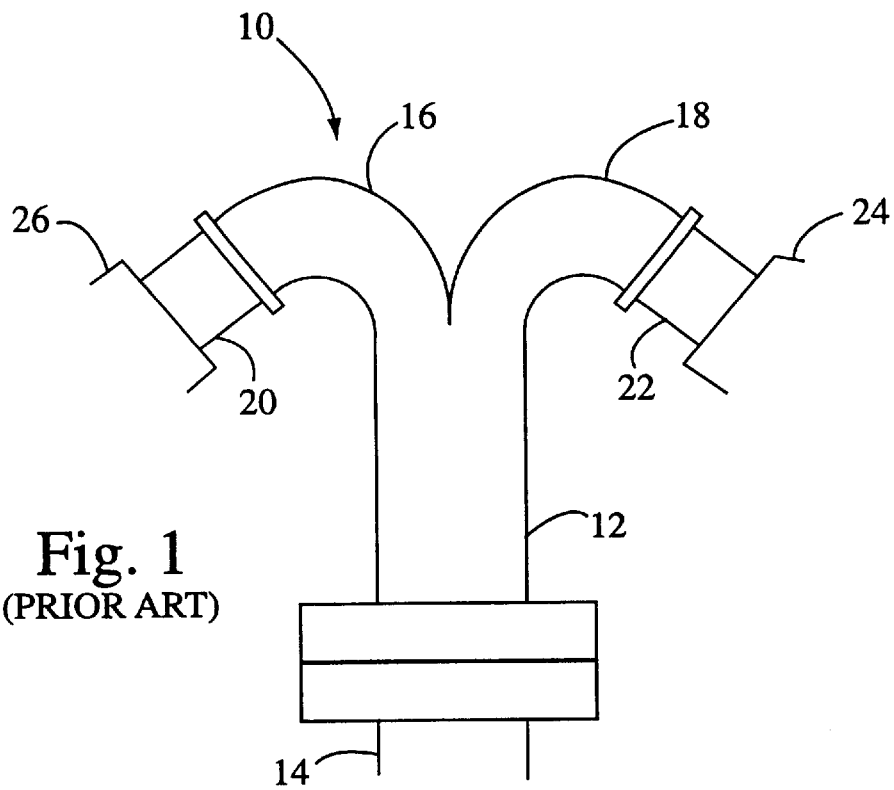
FIG. 1 shows a diagram of an intake manifold in accordance with the prior art.

Referring to FIG. 1, there is shown a conventional intake manifold 10 for a two-cylinder motorcycle engine in accordance with the prior art. The intake manifold 10 includes a ram tube portion 12 configured to be attached at one end to a carburetor 14. The other end of the ram tube portion 12 is attached to a first end of first and second runner tubes 16 and 18. The second ends of the runner tubes 16 and 18 are attached to the intake ports 20 and 22 of first and second cylinder heads 24 and 26. The intake ports 20 and 22 lead to the cylinder head's combustion chamber (not shown).

In operation, the intake manifold 10 directs the air/fuel mixture from the carburetor 14 through the ram tube portion 12, and through the runner portions to one of the intake ports 20, 22. This flow of the air/fuel mixture occurs during the intake stroke when the intake valve (not shown) of one of the cylinder heads is open.

One problem with this kind of engine is an imbalance in intake charge that occurs because of a variation in time intervals between successive firing of the two cylinders. In particular, sometimes there is a delay of 315 degrees between successive firings and at other times there is a delay of 405 degrees between firings. This variation causes different conditions to exist within the intake manifold 10 depending on delay. This means that the air/fuel ratio and volumetric efficiency is different for the two cylinders. The result is an imbalance in the power pulses between the cylinders.

In order to stabilize the pulses between cylinders, the present inventors have created an alternative intake manifold. The present inventors have recognized that the above described imbalances in the intake charges can be minimized by an intake manifold that includes a plenum chamber that acts as a buffer to reduce the variations in the charge that is delivered to each combustion chamber.

Figure 2:
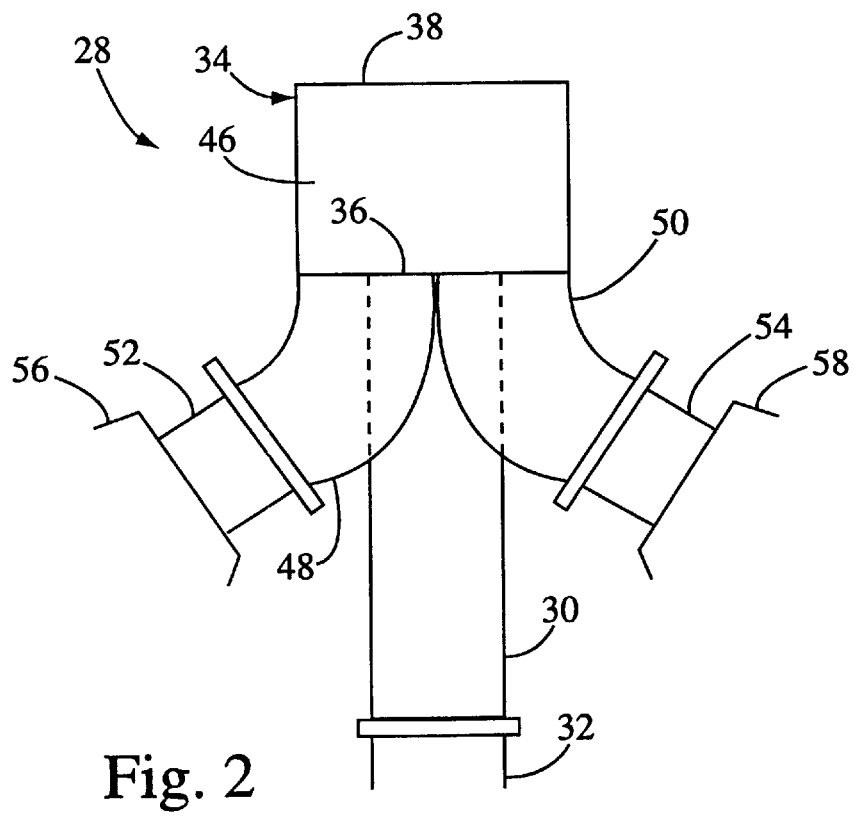
FIG. 2 shows a top view of an intake manifold for a two-cylinder engine in accordance with a preferred embodiment of the present invention.
Figure 3:
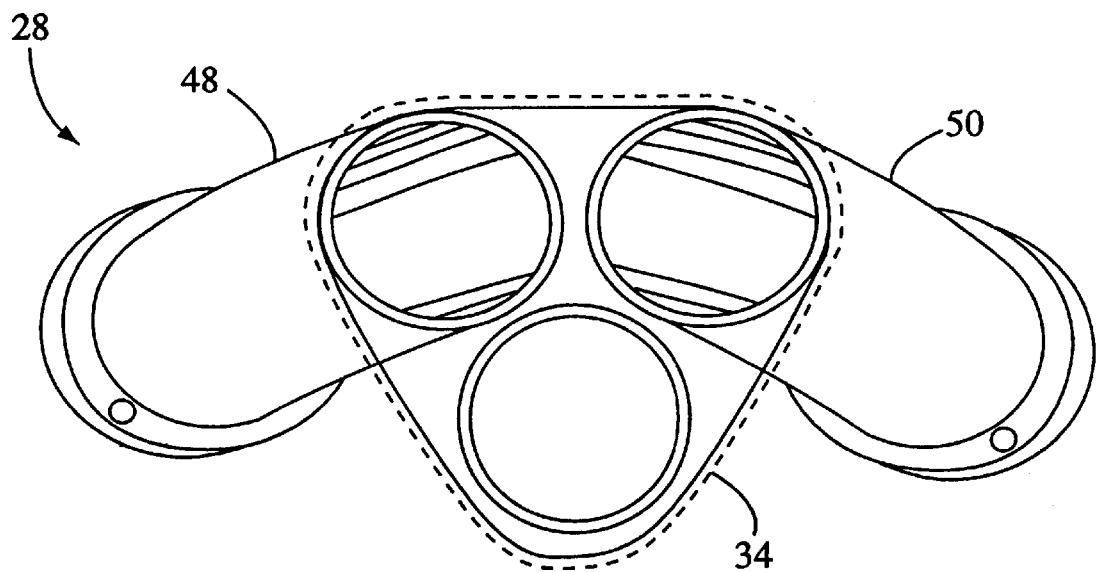
FIG. 3 is a cross-sectional view of the intake manifold shown in FIG. 2.
Figure 4:
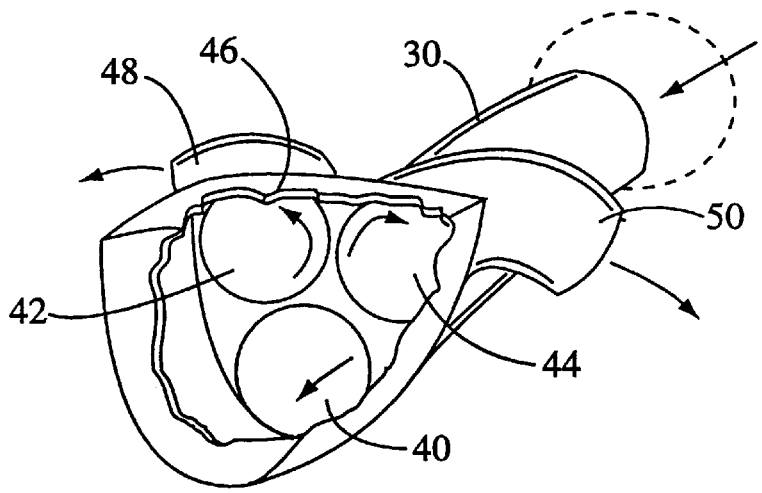
FIG. 4 is a cut-away perspective view of the intake manifold shown in FIG. 3.

FIG. 2 shows an intake manifold 28 in accordance with a preferred embodiment of the invention. This intake manifold 28 is configured to be used in place of the intake manifold 19 shown in FIG. 1. The intake manifold 28 includes a first stage ram tube 30 that is attached at a first end to a carburetor 32. In the case of a fuel injection engine the first end of the first stage ram tube will be attached to the throttle body instead of the carburetor 32. A second end of the first stage ram tube 30 is attached to a plenum chamber 34. Further details of the intake manifold 28 are shown in FIGS. 3 and 4.

The plenum chamber 34 includes a first, relatively flat wall 36, and a second, relatively flat wall 38 that is parallel to the first wall 36. It is possible to modify the configuration of the first and second walls to depending on the desired performance and other factors such as RPM range. The first wall 36 has three openings 40, 42 and 44. The second wall 38 has no openings. The two walls 36, 38 form two ends of the plenum chamber 34. The sides of the plenum chamber 34 are formed by a generally triangular side portion 46 which is attached to the first and second walls 36, 38. The second end of the first stage ram tube 30 is attached to the first wall 36 at the opening 40.

A second stage of the intake manifold 28 is comprised of first and second runner tubes 48 and 50 which are connected at their first ends to the first wall 36 at the openings 42 and 44 respectively. The second ends of the first and second runner tubes 48, 50 are connected to first and second intake ports 52 and 54, which are connected to the front and rear cylinder heads 56 and 58. While the runner tubes and first stage ram tubes are generally parallel in the preferred embodiment, depending on the desired performance and RPM range, it may be preferable to have these tubes disposed at various angles.

The intake manifold 28 receives the air/fuel mixture from the carburetor 32. The air/fuel mixture enters the first stage ram tube 30 and then enters the plenum chamber 34 at opening 40. Once inside the plenum chamber 34 the air/fuel mixture will leave through either opening 42 or 44 depending on which cylinder is at its intake cycle and is therefore drawing in the air/fuel mixture. That is, if the front cylinder head 56 is at its intake cycle, the intake valve is open and the downward movement of the piston creates negative pressure in the intake port 52. This negative pressure will force the air/fuel mixture to pass from the first stage ram tube 30 into the plenum chamber 34 and out through the first runner tube 48. Similarly, when the rear cylinder head is in its intake cycle, the negative pressure at the second intake port 54 will force the air/fuel mixture to from the first stage ram tube 30 into the plenum chamber 34 and out through the second runner tube 50.

In the prior art intake manifold 10 the air/fuel ratio and the volumetric efficiency is affected by the time between the intake cycles of the front and rear cylinders. This results in an imbalance between the power impulses of the two cylinders, described above as "odd fire" power impulses. In the intake manifold 28 of the present invention, these differences in the air/fuel conditions are minimized because the plenum chamber 34 acts as a buffer. That is, by having the air/fuel mixture enter the plenum chamber 34, instead of passing directly into the cylinder head intake port, the short-term variances are reduced. One factor is the fact that the air/fuel mixture is delayed in its path through the intake manifold. Also, the air/fuel mixture is contained in the plenum chamber 34 where turbulence is created as the air/fuel mixture changes direction by 180 degrees before it leaves the plenum chamber.

The result of this buffering is that differences in the air/fuel mixture between power impulses separated by, for example, 315 degrees and those separated by 405 degrees are greatly reduced. As a result there is less variation is volumetric efficiency and air/fuel ratio, and the engine runs smoother and more efficiently. In addition, the use of the plenum chamber 34 and the second stage runner tubes 48, 50, results in an inertial ram effect after the piston passes bottom dead center and while the intake valve is still open. This occurs because after the mechanical intake cycle into the cylinder there is still negative pressure in the cylinder due to the time element. The inertia in the flow of the intake charge in the intake port causes the intake port to keep filling the cylinder for a period of time. Specifically, this is the period of time after the piston has passed bottom dead center and while the intake valve is still open. In a normally aspirated racing engine, this effect is known to produce volumetric efficiencies as high as 115 percent. Numerous modifications to and alternative embodiments of the present invention will be apparent to those skilled in the art in view of the foregoing description. For example the exact dimensions and shapes of the plenum chamber and runner tubes may be modified to optimize the operation for any given engine design. For example, in some engines there may be space limitations that prevent the use of runner tubes and first stage ram tubes with circular cross sections, so square or rectangular tubes may be necessary. In addition, the advantages of the invention may be achieved in engines having more than two cylinders. In this case the intake manifold may have additional runner tubes attached to additional cylinder heads. Also, additional intake manifolds may by incorporated into the same engine to operate with the additional cylinders.

Accordingly, this description is to be construed as illustrative only and is for the purpose of teaching those skilled in the art the best mode of carrying out the invention. Details of the structure and method may be varied substantially without departing from the spirit of the invention and the exclusive use of all the modifications, which come within the scope of the appended claims, is reserved.

What is claimed is:

1. An intake manifold for an internal combustion engine comprising:
   a first tubular member having openings at first and second ends;
   a chamber having at least three openings disposed along a first wall of the chamber; and
   second and third tubular members, each having first and second open ends, the first open ends of the second and third tubular members being attached to the second and third chamber openings, wherein at least two continuous passageways exist, the first passageway beginning at the second opening of the first tubular member, continuing into the chamber, into the second tubular member's first open end, and ending at the second open end of the second tubular member, and the second passageway beginning at the second opening of the first tubular member, continuing into the chamber, into the third tubular member's first open end, and ending at the second open end of the third tubular member.

2. An intake manifold according to claim 1 wherein the three tubular members are relatively parallel to each other in a region near their first ends.

3. An intake manifold according to claim 2 wherein the chamber has at least one flat wall and all three chamber openings are disposed on said wall.

4. An intake manifold according to claim 3 wherein the chamber has a second flat wall parallel to the first flat wall.

5. An intake manifold according to claim 4 wherein the passageway is configured such that fluid flowing into the chamber through the first opening reverses direction within the chamber and exits the chamber into the second and third openings in a direction generally opposite to the direction of the fluid entering the chamber.

6. An intake manifold according to claim 4 wherein the chamber has at least three sides perpendicular to the first and second flat walls.

7. An intake manifold according to claim 1 wherein the second opening of the first tubular member is configured to be attached to a carburetor.

8. An intake manifold according to claim 7 wherein the second opening of the second and third tubular members are configured to be attached to the intake port of a pair of cylinder heads.

9. An intake manifold according to claim 1 wherein the first, second and third tubular members each have a circular cross section.

10. An intake manifold for a two-cylinder engine having a carburetor and two cylinder heads, each cylinder head having an intake port, the intake manifold comprising:

an intake ram tube for receiving an air/fuel mixture at a first end;

a plenum having at least one flat wall and at least three openings all disposed on said flat wall, a first opening being attached to a second end of the intake ram tube, the plenum having an enclosed chamber, wherein the plenum is configured such that the air/fuel mixture entering the plenum reverses direction before exiting the plenum; and first and second runner tubes attached at a first end to the second and third plenum openings respectively, the other end of the runner tubes being attached to the intake port of one of the cylinders, wherein the air/fuel mixture entering the first end of the intake ram tube must enter the plenum before passing out of the runner tubes thereby creating a buffer for the flow of the air/fuel mixture, whereby a more balanced air/fuel mixture enters the two cylinders.

11. An intake manifold according to claim 10 wherein the plenum has a second flat wall parallel to at least one flat wall.

12. An intake manifold according to claim 11 wherein the intake ram tube and the two runner tubes each have a circular cross section.

* * * * *